United States Patent [19]
Friederich et al.

[11] Patent Number: 5,702,132
[45] Date of Patent: Dec. 30, 1997

[54] PIVOTAL LINK

[75] Inventors: Hans-Werner Friederich, Winsen; Günter Kupczik, Wittenbergener Weg 18, DE 22559 Hamburg, both of Germany

[73] Assignees: Günter Kupczik; Phoenix Aktiengesellschaft, both of Hamburg, Germany

[21] Appl. No.: 356,291

[22] PCT Filed: Apr. 20, 1994

[86] PCT No.: PCT/DE94/00428

§ 371 Date: Dec. 12, 1994

§ 102(e) Date: Dec. 12, 1994

[87] PCT Pub. No.: WO94/25784

PCT Pub. Date: Nov. 10, 1994

[30] Foreign Application Priority Data

Apr. 24, 1993 [DE] Germany .................. 43 13 501.3

[51] Int. Cl.[6] .................................................. F16L 21/00
[52] U.S. Cl. .................. 285/235; 285/423; 138/127; 138/174
[58] Field of Search ............................ 285/235, 236, 285/229, 184, 423; 138/127, 153, 174

[56] References Cited

U.S. PATENT DOCUMENTS

| | | | |
|---|---|---|---|
| 1,288,148 | 12/1918 | Oden | 138/127 X |
| 1,736,106 | 11/1929 | Williamson | 138/127 |
| 3,169,552 | 2/1965 | Fawick | 138/174 X |
| 3,186,048 | 6/1965 | Tann | 285/235 X |
| 3,374,856 | 3/1968 | Wirt | 138/153 X |
| 4,140,154 | 2/1979 | Kanao | 138/174 X |
| 4,240,653 | 12/1980 | Ishigaki et al. | |
| 4,674,543 | 6/1987 | Ziemek et al. | 138/153 |
| 4,982,765 | 1/1991 | Usui | 138/174 X |
| 5,193,588 | 3/1993 | Kanao | 138/174 X |

FOREIGN PATENT DOCUMENTS

| | | | |
|---|---|---|---|
| 255125 | 2/1963 | Australia | 285/229 |
| A 1965410 | 7/1970 | Germany . | |
| A 2606180 | 8/1977 | Germany . | |
| U 8804366 | 8/1989 | Germany . | |

*Primary Examiner*—Dave W. Arola
*Attorney, Agent, or Firm*—Collard & Roe, P.C.

[57] ABSTRACT

Pivotal link (1) as a connection piece between two construction parts, whereby at least one construction part is supported rotatable around its horizontal axis. The essence of the invention consists in that the pivotal link consists of a hose or a hose-like body made of elastomeric material, whereby an embedded strength carrier (4) is present between the hose core (2) and the hose cover (3), said carrier consisting of threads forming one or multiple layers and extending at an angle α amounting to zero degrees based on the axial direction of the pivotal link, or only insignificantly deviating from zero degrees with a crossed arrangement of the threads; and that the pivotal link is additionally provided with rings (7), the latter being arranged in the radial direction.

18 Claims, 2 Drawing Sheets

PIVOTAL LINK

The invention relates to a pivotal link as a connection piece between two construction parts, whereby at least one construction part is supported rotatable around its horizontal axis.

A device for controlling the through-flow through waste water ducts is known from DE-C-39 22 481. In this connection, one construction part consists of a bow-shaped center section which, on both sides, changes into horizontally ending duct sections. The overall construction part is, in this connection, supported rotatable around its horizontal axis. Said construction part (also called a rotary bow) is rotatable to a height such that the high point of the bottom of the bow is liftable as high as the water level adjacent upstream- Now, rigid (i.e., unmovable) duct sections are present on both sides of said rotary bow, whereby the horizontally ending duct sections of the rotary bow are connected with said rigid duct sections via connection pieces. Said connection pieces are equipped with sliding bearings which, at the same time, have a sealing function. In this way, rotatability of the rotary bow relative to the rigid duct sections is to be assured without possibility for the waste water to exit.

However, such pivotal links consisting of connection pieces and bearings do not satisfy the highest requirements. For example, with torsions of ±90 degrees and more, there is the risk of damage to the pivotal link as well as also of breakage of the adjacent construction parts that are connected with said pivotal link. Moreover, such pivotal links require much manufacturing expenditure and they are, therefore, expensive as well. At the same time, such pivotal links are highly susceptible to soiling.

A distinction must be made between the pivot links specified above and elastic tube connectors, which have the function of compensating for assembly inaccuracies, vibrations, changes in length, axial and angular displacements of the connected tubes. Such compensators are in most cases designed as hose-like bodies with embedded strength carriers.

Now, the problem of the invention is to make available for torsionally stressed construction parts a pivotal link that satisfies the highest requirements irrespective of the application purpose, i.e., which, in view of adaptation of the rotary motion and also of efficient sealing, retains its full functionality under long-term stresses even at extreme torsion angles.

The invention is explained in greater detail in the following on exemplified embodiments by reference to the schematic drawings, in which.

Figure 1:
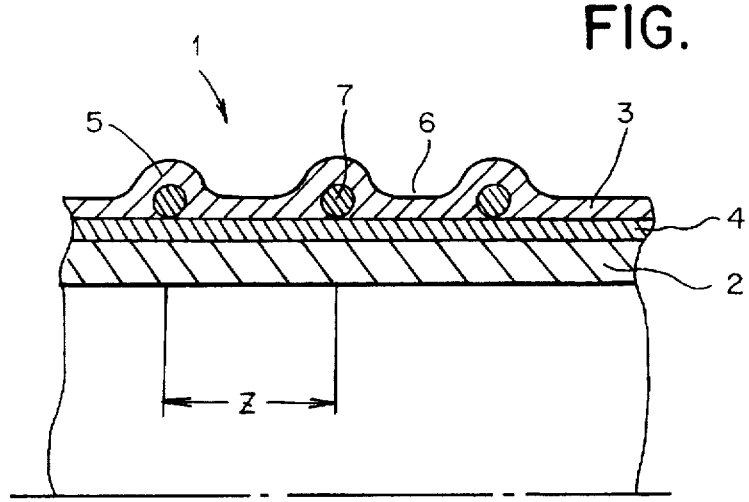
FIG. 1 shows a pivotal link with embedded radial rings, whereby the surface structure is substantially wavy.

FIG. 1 shows a pivotal link (1) as a hose or hose-shaped body, whereby an embedded strength carrier (4) is present between the hose core (2) and the hose cover (3); said strength carrier is explained in greater detail in connection with FIG. 4. The hose cover has, on the outside, the ribs (5) and the grooves (6), which substantially extend wave-shaped. Now, within the range of the ribs, namely within the hose cover, the embedded rings (7) are present, which are arranged in the radial direction. Said rings, which particularly consist of steel or plastic monofilament, are arranged across the total length of the pivotal link, and, in this connection, have approximately the same spacing Z relative to each other. Said spacing Z usefully amounts to 30 to 1000 mm, in particular to 80 to 250 mm.

The hose or hose-like body consists of a rubber mixture based on polychloroprene (CR), natural rubber (NR), ethylene-propylene-diene copolymer (EPDM), styrene-butadiene rubber (SBR), fluorine rubber (FKM), isoprene rubber (IR), butadiene rubber (BR), nitrile rubber (NRB, butyl rubber (IIR), chlorinated or brominated butyl rubber (CIIR or BrIIR), chlorosulphonated polyethylene (CSM), ethylene-vinyl acetate rubber (EVA), hydrogenated nitrile rubber (H-NBR), or mixtures of said types of rubber.

Figure 2:
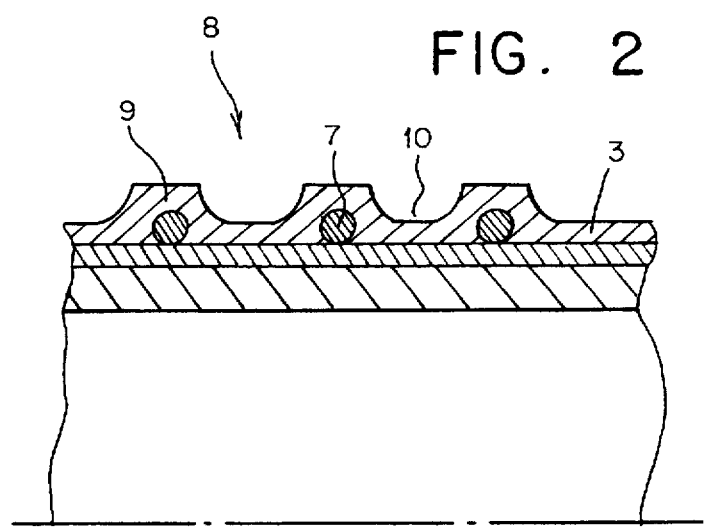
FIG. 2 shows a pivotal link with embedded radial rings, whereby the surface has crown-shaped elevations.

Now, FIG. 2 shows a pivotal link (8), whereby the surface of the hose cover (3) has crown-shaped elevations (9) and the bow-shaped grooves (10). As in the exemplified embodiment according to FIG. 1, the rings (7) are arranged within the hose cover within the range of the ribs in this case as well.

Figure 3:
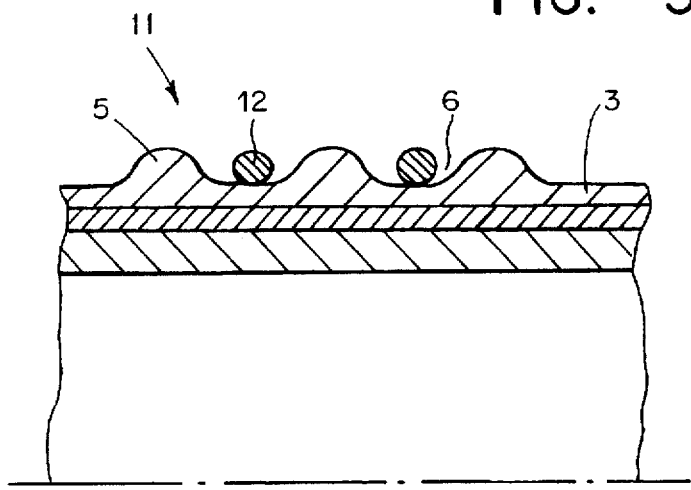
FIG. 3 shows a pivotal link with rings arranged on the surface, such rings bring disposed within deepenings.

According to FIG. 3, the hose cover (3) of the pivotal link (11) has, as with the exemplified embodiment according to FIG. 1, the ribs (5) and the grooves (6) on the outer side, which substantially extend wave-like. However, in the present case, the rings (12) are arranged outside of the hose cover, namely within the grooves (6).

Figure 4:
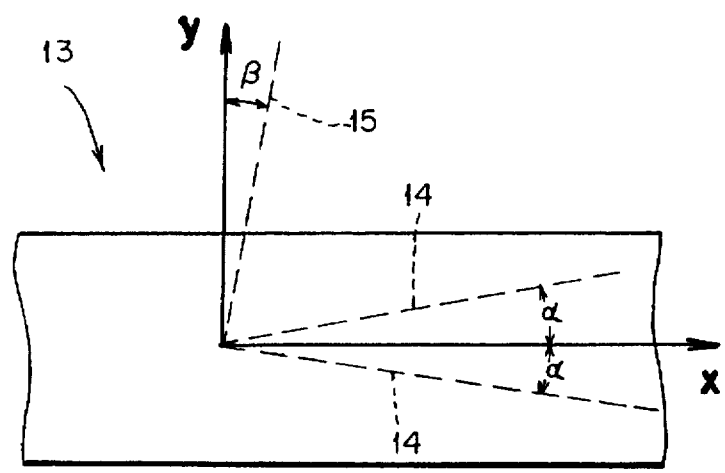
FIG. 4 shows a pivotal link with an integrated diagrammatic representation illustrating the course of the angles $\alpha$ and $\beta$ or the embedded, thread-like strength carriers.

Now, FIG. 4 shows a pivotal link (13), whereby a diagram is incorporated schematically for illustrating the course of the threads (14, 15), which are components of the embedded strength carrier (4; FIG. 1). In this connection, the abscissa X is the axial direction, and the ordinate Y is the radial direction of the pivotal link. The angle $\alpha$ of the threads (14) extending in the axial direction amounts to 0 to ±15 degrees, in particular 0 to ±5 degrees, whereby the threads (14) are arranged crossed at an angle $\alpha$ not equal to zero degrees. The angle $\beta$ of the threads (15) extending in the radial direction amounts to 0 to ±15 degrees, in particular 0 to ±5 degrees as well, whereby here, the threads (15) are arranged crossed or not crossed (i.e., extending exclusively in one direction) at an angle $\beta$ not equal to zero degrees. The threads (14, 15) consist of a highly extensible material, in particular material based on polyamide. Especially the threads (14) extending in the axial direction should have said material properties.

Figure 5:
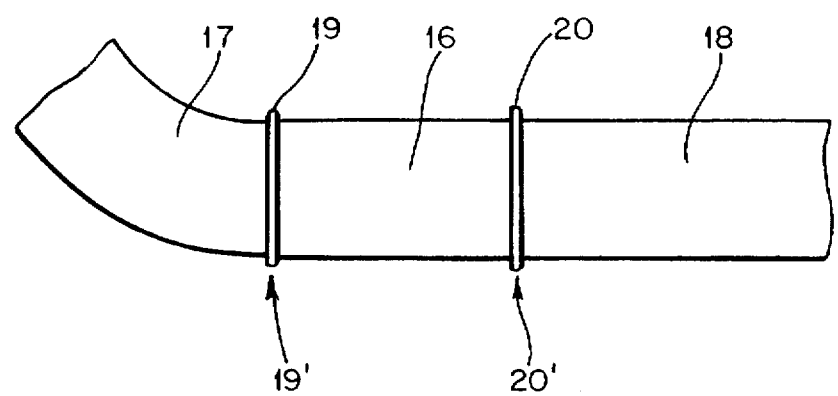
FIG. 5 shows a rotary bow, which is connected with the adjacent rigid duct section by means of the pivotal link.

Now, FIG. 5 shows a pivotal link (16) as a connection piece between a rotary bow (17) and a rigid (i.e., unmovable) duct section (18). In this connection, the individual construction parts (16, 17, 18) are solidly and sealingly connected with each other by means of flanges (19, 20 and screws. Other connection systems (e.g. sockets) are usable as well. Regarding the connection technology, reference is made to the general state of the art.

With a pivotal link according to DE-C 39 22 481, whereby the connection piece is a steel pipe, a flange connection can be obtained only in the zone of transition (position 19'; FIG. 5) between the rotary bow and the connection piece, whereas the joints of the connection piece and of the duct section (18) must have adequate clearance for movement. For this purpose, the connection piece according to DE-C-39 22 481 is equipped in said flangeless zone of transition (position 20'; FIG. 5) with a sliding bearing, which has to have a sealing function at the same time as well. In the event of failure of the rotary function of this pivotal link, which is susceptible to failure, and which consists of a connection piece made of steel, and of a sliding bearing, considerable forces occur especially in said zone of transition (position 20'; FIG. 5), which forces may lead to fracture of individual construction parts. Now, said problem has been solved with the pivotal link according to the invention. Therefore, in this way, the pivotal link can be rigidly and sealingly connected with the rotary bow (17) and the rigid duct section (18) without limiting the movability of the link at a torsion of ±90 degrees or more. The risk of fracture is no longer posed because of the high elasticity of the pivotal link.

Since the pivotal link (1, 8, 11, 13, 16) tends to shorten itself during torsion, a corresponding compensation in length can be created now particularly via the highly extensible threads (14; FIG. 4) extending in the axial direction.

Figure 6:
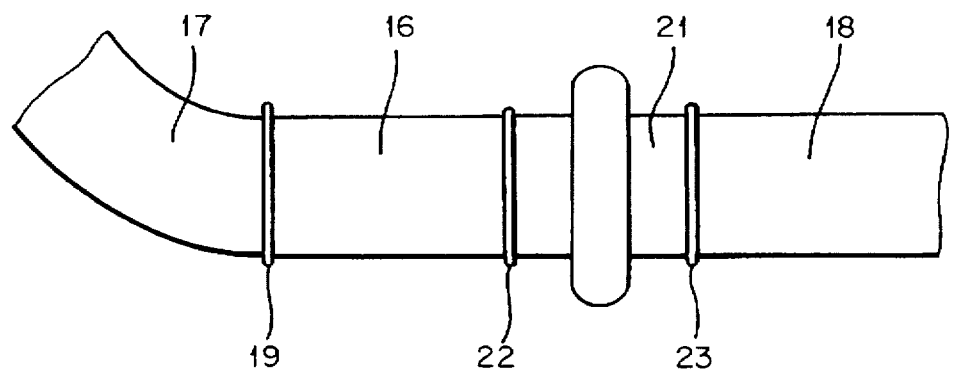
FIG. 6 shows a rotary bow, which is connected with the adjacent rigid duct section by means of the pivotal link and an additional compensator.

Furthermore, it is possible also according to FIG. 6 to additionally install a compensator (21), which is arranged between the pivotal link (16) and the duct section (118). It is important that such compensator exclusively serves for length compensation; however, as opposed to the pivotal link, without being subjected to any torsion. In the present case, too, the individual construction parts (16, 17, 18, 21) are rigidly and sealingly connected with each other via the respective flanges (19, 22, 23) or the like. With respect to the construction of the compensator (21), reference is made, for example to DE-A-26 06 180.

Even though the scope of application of the pivotal link (1, 8, 11, 13, 16) according to the invention is to be seen primarily in connection with a device for controlling the through-flow through waste water ducts, whereby the rotary bow (17; FIGS. 5 and 6) is the device controlling the through-flow, the scope of application of such pivotal links offers a wide spectrum, for example in connection with excavator conduits which are floatingly supported on the surface of the water. Wave movements may cause considerable torsions on individual construction components of the conduits, which can now be, compensated by means of the pivotal link according to the invention.

We claim:

1. Pivotal link having an axial direction X and a radial direction Y as a connection piece between two construction parts, with at least one construction part having means for being supported rotatable around its horizontal axis, said pivotal link comprising a hose having a hose core and a hose cover, and made of elastomeric material; said pivotal link having means for being supported rotatably around its horizontal axis;

an embedded strength carrier located between the hose core and the hose cover, said carrier including threads forming at least one layer and extending at an angle α relative to the axial direction X of the pivotal link, said angle α ranging between zero degrees and ±5 degrees, only insignificantly deviating from zero degrees, with a crossed, arrangement of the threads;

wherein the threads extending in the axial direction X of the pivotal link consist of an extensible material;

wherein the threads extending in the axial direction X are additionally provided with threads extending at an angle β relative to the radial direction Y of the pivotal link, said angle β ranging between zero degrees and ±5 degrees with the threads extending at said angle β ranging from crossed to uncrossed; and rings for the pivotal link engaging the hose and being arranged in the radial direction; and wherein the rings are arranged across the total length of the pivotal link and, in this connection, have approximately the same spacing Z relative to each other.

2. Pivotal link according to claim 1, wherein the hose is selected from the group consisting of a rubber based on polychloroprene (CR), natural rubber (NR), ethylene-propylene-diene copolymer (EDPM), styrene-butadiene rubber (SBR), fluorine rubber (FKM), isoprene rubber (IR), butadiene rubber (BR), nitrile rubber (NBR), butyl rubber (IIR), chlorinated or brominated butyl rubber (ClIIR or BrIIR), chlorosulphonated polyethylene (CSM), ethylene-vinyl acetate rubber (EVA), hydrogenated nitrile rubber (H-NBR), and the mixtures thereof.

3. Pivotal link according to claim 1, wherein the rings have a spacing Z of 30 to 1000 mm.

4. Pivotal link according to claim 1, wherein the rings are made of a material selected from the group consisting of steel and plastic monofilament.

5. Pivotal link according to claim 1, wherein the rings are arranged outside of the hose cover.

6. Pivotal link according to claim 5, wherein the rings are arranged in the grooves.

7. Pivotal link according to claim 1, wherein the rings are arranged within the hose cover.

8. Pivotal link according to claim 1, wherein the hose cover comprises a rib-groove system.

9. Pivotal link according to claim 8, wherein the rings are arranged within a zone of the ribs.

10. Pivotal link according to claim 8, wherein the ribs and the grooves are substantially wave-like in appearance.

11. Pivotal link according to claim 8, wherein the ribs are crown-shaped in appearance and the grooves are bow-shaped in appearance.

12. Pivotal link according to claim 1, further comprising a compensator made of elastomeric materials and has means for connection to at least said pivotal link for exclusively serving for length compensation.

13. Pivotal link according to claim 12, wherein the compensator has means for connection to a rigid, construction part.

14. The pivotal link of claim 1, wherein said pivotal link is a connection piece means between a rotary bow as the through-flow controlling device, and a duct.

15. The pivotal link of claim 1, wherein said pivotal link is a connection piece means in fixed pipeline construction.

16. The pivotal link of claim 1, wherein said pivotal link is a connection piece means with loosely laid pipelines.

17. Pivotal link according to claim 1, wherein the extensions material of the threads is a polyamide.

18. Pivotal link according to claim 1, wherein the rings have a spacing Z of 80 to 250 mm.

* * * * *